(12) United States Patent
Ishikawa et al.

(10) Patent No.: US 11,279,635 B2
(45) Date of Patent: Mar. 22, 2022

(54) METHOD OF USING AN AGRICULTURAL ELECTROLYZED WATER-GENERATING APPARATUS FOR GENERATION OF AGRICULTURAL ELECTROLYZED WATER USEFUL FOR PLANT GROWTH

(71) Applicants: NIHON TRIM CO., LTD., Osaka (JP); NATIONAL UNIVERSITY CORPORATION KOCHI UNIVERSITY, Kochi (JP)

(72) Inventors: Katsumi Ishikawa, Kochi (JP); Daiji Amenomori, Kochi (JP); Yasuomi Hamauzu, Kochi (JP)

(73) Assignees: NIHON TRIM CO., LTD., Osaka (JP); NATIONAL UNIVERSITY CORPORATION KOCHI UNIVERSITY, Kochi (JP)

( * ) Notice: Subject to any disclaimer, the term of this patent is extended or adjusted under 35 U.S.C. 154(b) by 133 days.

(21) Appl. No.: 16/796,568

(22) Filed: Feb. 20, 2020

(65) Prior Publication Data

US 2020/0189939 A1 Jun. 18, 2020

Related U.S. Application Data

(63) Continuation of application No. 15/506,086, filed as application No. PCT/JP2015/004304 on Aug. 26, 2015, now abandoned.

(30) Foreign Application Priority Data

Sep. 1, 2014 (JP) .............................. JP2014-177031

(51) Int. Cl.
*C02F 1/461* (2006.01)
*C02F 1/46* (2006.01)
*A01G 31/00* (2018.01)

(52) U.S. Cl.
CPC ............ *C02F 1/4618* (2013.01); *A01G 31/00* (2013.01); *C02F 1/46* (2013.01);
(Continued)

(58) Field of Classification Search
CPC .......... C02F 2209/003; C02F 2209/001; C02F 2209/006; C02F 1/461; C02F 1/46
See application file for complete search history.

(56) References Cited

U.S. PATENT DOCUMENTS 5,540,819 A * 7/1996 Bakhir ................ C02F 1/46104
205/747
5,997,717 A * 12/1999 Miyashita ............. C02F 1/4618
205/466

(Continued)

FOREIGN PATENT DOCUMENTS

CN 203346132 U 12/2013
EP 2179971 A1 4/2010
(Continued)

OTHER PUBLICATIONS

Machine translation of WO2012/090078 of Tanahashi et al. (Year: 2012).*

(Continued)

*Primary Examiner* — Brian W Cohen
(74) *Attorney, Agent, or Firm* — Alston & Bird LLP

(57) ABSTRACT

An electrolyzed water generating apparatus 1 includes: an electrolysis tank D containing a first electrode chamber Da having a cathode 6a, a second electrode chamber Db having anode 6b, and a separating membrane Sp separating the first electrode chamber Da and the second electrode chamber Db from each other; a first water inlet path 4a supplying the first electrode chamber Da with raw water from outside; a first water outlet path 7a carrying to outside hydrogen-containing electrolyzed water generated by electrolysis in the first (Continued)

electrode chamber Da; and a charge amount adjuster 10 for adjusting, during the electrolysis, an amount of electrical charge to be provided to the hydrogen-containing electrolyzed water. The charge amount adjuster 10 adjusts the amount of electrical charge per unit quantity of the generated hydrogen-containing electrolyzed water through control of an electrolytic current or an electrolytic voltage.

11 Claims, 2 Drawing Sheets

(52) U.S. Cl.
CPC ............... *C02F 2201/4614* (2013.01); *C02F 2201/46115* (2013.01); *C02F 2209/06* (2013.01)

(56) References Cited

U.S. PATENT DOCUMENTS

| | | |
|---|---|---|
| 2002/0134691 A1 | 9/2002 | Satoh et al. |
| 2003/0089618 A1 | 5/2003 | Satoh et al. |
| 2009/0311342 A1 | 12/2009 | Sumita |
| 2010/0200425 A1 | 8/2010 | Arai |
| 2011/0198236 A1 | 8/2011 | Sumita et al. |

FOREIGN PATENT DOCUMENTS

| | | | |
|---|---|---|---|
| EP | 2338841 A1 | 6/2011 | |
| JP | H09-168783 | 6/1997 | |
| JP | 2002-320416 A | 11/2002 | |
| JP | 2005-186034 A | 7/2005 | |
| JP | 2007-152156 A | 6/2007 | |
| JP | 2008-036521 A | 2/2008 | |
| JP | 2009-072755 A | 4/2009 | |
| JP | 2010-094622 A | 4/2010 | |
| JP | 2011-136333 A | 7/2011 | |
| JP | 2012-034649 A | 2/2012 | |
| KR | 10-1320463 B1 | 7/2013 | |
| KR | 2013-073831 A | 7/2013 | |
| WO | WO-2012060078 A1 * | 5/2012 | ............. C02F 1/467 |
| WO | WO-2012/060078 A1 | 10/2012 | |
| WO | WO-2013/095024 A1 | 6/2013 | |

OTHER PUBLICATIONS

International Searching Authority, International Search Report and Written Opinion for International Application No. PCT/JP2015/004304, dated Oct. 27, 2015, (8 pages), Japanese Patent Office.

European Patent Office, Extended European Search Report for Application No. 15838641.7, dated Apr. 24, 2018, (8 pages), Germany.

\* cited by examiner

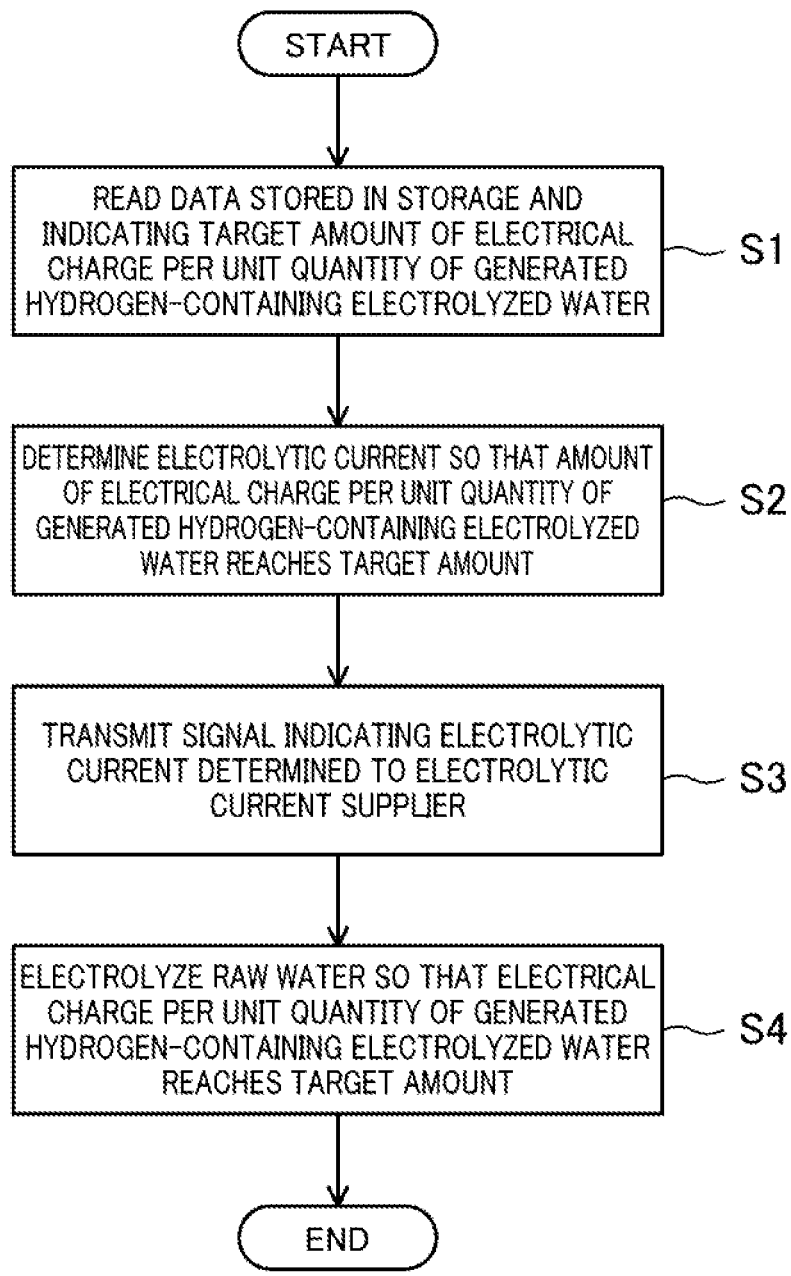

METHOD OF USING AN AGRICULTURAL ELECTROLYZED WATER-GENERATING APPARATUS FOR GENERATION OF AGRICULTURAL ELECTROLYZED WATER USEFUL FOR PLANT GROWTH

CROSS REFERENCE TO RELATED APPLICATIONS

This application is a continuation application of U.S. application Ser. No. 15/506,086, filed Feb. 23, 2017, which United States application is a national stage application, filed under 35 U.S.C. § 371, of International Application No. PCT/JP2015/004304, filed Aug. 26, 2015, which international application further claims priority to and the benefit of Japanese Application No. 2014-177031, filed Sep. 1, 2014; the contents of all of which as are hereby incorporated by reference in their entirety.

BACKGROUND

Technical Field

The present invention relates to an agricultural electrolyzed water-generating apparatus which electrolyzes water to generate agricultural electrolyzed water. The present invention also relates to the agricultural electrolyzed water.

Description of Related Art

Use of tap water, ground water, and river water as agricultural water is known in the art. However, the decrease in water resources due to the excessive use of water has become a worldwide problem. Meanwhile, there is increasing demand for food and improvement in quality of crops. Hence, it is essential for the agricultural sector to efficiently use high-quality water resources.

That is why development of functional water provided with a certain function by some sort of processing is promising, because functional water may contribute to improvement in production efficiency and quality of agricultural products.

A proposed use of this functional water is for agricultural water containing metal chelate salt including such metals as iron and manganese necessary for plant cultivation (see Japanese Unexamined Patent Publication No. 2002-320416, for example).

BRIEF SUMMARY

The functional water disclosed in Japanese Unexamined Patent Publication No. 2002-320416 is produced through a chemical process causing a particular metal to dissolve in the water, and thus is effective in a healthy rhizosphere; in a rhizosphere out of balance, however, this functional water cannot achieve its expected effects.

Moreover, the rhizoplane is negatively charged, and substances travel through the rhizosphere mainly as charged ions. Thus, use of positively charged water may curb an increase in pH levels and reduce pH-related damage. Furthermore, the positively charged water improves water quality by enhancing hydrogen bonds and thus makes the root stronger. Hence, the use of electrically processed water would facilitate the maintenance of a healthy rhizosphere.

The present invention is conceived in view of the above issues, and attempts to provide an agricultural electrolyzed water generating apparatus which may generate hydrogen-containing electrolyzed water usable as agricultural electrolyzed water useful for plant growth. The present invention also attempts to provide the agricultural electrolyzed water.

In order to carry out the above attempts, an agricultural electrolyzed water generating apparatus includes: an electrolysis tank containing a first electrode chamber having a cathode, a second electrode chamber having an anode, and a separating membrane separating the first electrode chamber and the second electrode chamber from each other; a first water inlet path connected to the first electrode chamber to supply the first electrode chamber with raw water from outside; a second water inlet path connected to the second electrode chamber to supply the second electrode chamber with the raw water from outside; a first water outlet path connected to the first electrode chamber, and carrying to outside hydrogen-containing electrolyzed water generated by electrolysis in the first electrode chamber; a second water outlet path connected to the second electrode chamber, and carrying to outside electrolyzed acidic water generated by the electrolysis in the second electrode chamber; and a charge amount adjuster connected to the electrolysis tank for adjusting, during the electrolysis, an amount of electrical charge to be provided to the hydrogen-containing electrolyzed water, wherein the charge amount adjuster adjusts the amount of electrical charge per unit quantity of the generated hydrogen-containing electrolyzed water through control of an electrolytic current or an electrolytic voltage.

Thanks to the above features, the amount of electrical charge per unit quantity of the obtained hydrogen-containing electrolyzed water is successfully adjusted, which enables electrically controlling the rhizosphere environment of plants and obtaining agricultural electrolyzed water (hydrogen-containing electrolyzed water) useful for plant growth.

The present invention allows to generate agricultural electrolyzed water useful for plant growth.

BRIEF DESCRIPTION OF THE FIGURES

FIG. 2 is a flowchart depicting how a charge amount adjuster according to the embodiment of the present invention adjusts the amount of electrical charge.

DETAILED DESCRIPTION OF VARIOUS EMBODIMENTS

Figure 1:
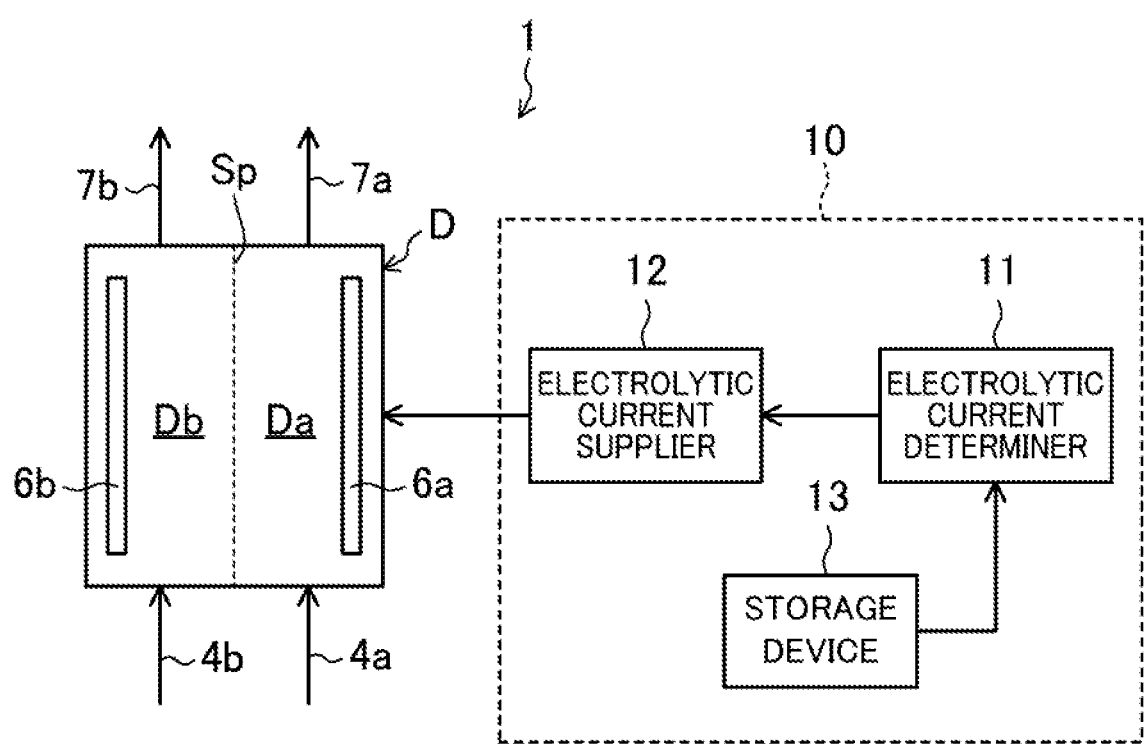
FIG. 1 illustrates an agricultural electrolyzed water generating apparatus according to an embodiment of the present invention.

Described below in detail is an embodiment of the present invention, with reference to the drawings. FIG. 1 illustrates an agricultural electrolyzed water generating apparatus (hereinafter referred to as "electrolyzed water generating apparatus") according to the embodiment of the present invention.

An electrolyzed water generating apparatus 1 electrolyzes raw water purified by a water purifier to generate agricultural water containing dissolved hydrogen for agricultural use (agricultural electrolyzed water).

The electrolyzed water generating apparatus 1 includes an electrolysis tank D. This electrolysis tank D contains: a separating membrane Sp shaped into a thin sheet; a first electrode chamber (a cathode chamber) Da; and a second electrode chamber (an anode chamber) Db. Here, the first chamber Da and the second chamber Db are separated from each other by the separating membrane Sp.

This separating membrane Sp, referred to as "separator", is a thin sheet formed of a material permeable to ions generated when water is electrolyzed.

Moreover, as illustrated in FIG. 1, the first electrode chamber Da is provided with a cathode 6a acting as a first electrode, and the second electrode chamber Db is provided with an anode 6b acting as a second electrode. The cathode 6a and the anode electrode 6b face each other across the separating membrane Sp.

The cathode 6a and the anode 6b may be made of any given material. An example of such materials is titan coated with platinum or iridium. In view of the electrolytic endurance of the electrodes, it is beneficial to use titan coated with platinum iridium.

As illustrated in FIG. 1, the electrolyzed water generating apparatus 1 further includes: a first water inlet path 4a connected to the first electrode chamber Da; and a second water inlet path 4b connected to the second electrode chamber Db. Here, the first water inlet path 4a and the second water inlet path 4b respectively supply the first electrode chamber Da and the second electrode chamber Db with raw water (raw water purified by the water purifier) from outside.

Moreover, as illustrated in FIG. 1, the electrolyzed water generating apparatus 1 includes: a first water outlet path 7a connected to the first electrode chamber Da; and a second water outlet path 7b connected to the second electrode chamber Db. Here, the first water outlet path 7a carries, to outside, hydrogen-containing electrolyzed water (regenerated water) generated by electrolysis in the first electrode chamber Da, and the second water outlet path 7b carries, to outside, electrolyzed acidic water generated by electrolysis in the second electrode chamber Db.

In this embodiment the hydrogen-containing electrolyzed water generated in the first electrode chamber Da is ejected through the first water outlet path 7a, and used as agricultural electrolyzed water. Note that the electrolyzed acidic water generated by electrolysis at the anode 6b is ejected through the second water outlet path 7b.

Here, a feature of the embodiment is that, when the electrolysis is performed using the electrolyzed water generating apparatus 1, an electrolytic current is controlled to adjust an amount of electrical charge [C/L] per unit quantity of the generated hydrogen-containing electrolyzed water. This procedure generates agricultural electrolyzed water (hydrogen-containing electrolyzed water) which is useful for plant growth.

Here, the "amount of electrical charge per unit quantity of the generated hydrogen-containing electrolyzed water" is the amount of electrical charge applied to one liter of water traveling, during the electrolysis, through an inside of the electrolyzed water generating apparatus 1 including the electrolysis tank D. Note that the amount of electrical charge may be calculated according to the following Equation (1):

[Math. 1]

$$C = I \times s \quad (1)$$

In Equation (1), "C" is an amount of electrical charge, "I" is an electrolytic current, and "s" is a time period (in seconds) required for one liter of water to travel through the inside of the electrolyzed water generating apparatus 1 including the electrolysis tank D.

To be more specific, as illustrated in FIG. 1, the electrolyzed water generating apparatus 1 of the embodiment includes a charge amount adjuster 10 for adjusting, during the electrolysis, the amount of electrical charge to be provided to the hydrogen-containing electrolyzed water.

Moreover, the charge amount adjuster 10 includes: an electrolytic current determiner 11 determining an electrolytic current during the electrolysis performed by the electrolyzed water generating apparatus 1; an electrolytic current supplier 12 connected to the electrolytic current determiner 11 and the electrolysis tank D, and supplying the electrolysis tank D with the electrolytic current; and a storage device 13 connected to the electrolytic current determiner 11 to store data indicating a target amount of electrical charge per unit quantity of the generated hydrogen-containing electrolyzed water.

Described next is how the charge amount adjuster 10 adjusts the amount of electrical charge.

FIG. 2 is a flowchart depicting how the charge amount adjuster 10 according to the embodiment of the present invention adjusts the amount of electrical charge.

First, the electrolytic current determiner 11 reads data stored in the storage device 13 and indicating a target amount of electrical charge per unit quantity of the generated hydrogen-containing electrolyzed water (Step S1).

Note that, typically, providing electrical charge to water alters the pH of the water. In order to avoid undesired side effects due to a rise in the pH, such as the formation of a white precipitate, in a culture solution using the hydrogen-containing electrolyzed water, the amount of electrical charge per unit quantity of the generated hydrogen-containing electrolyzed water beneficially ranges from 8 C/L to 300 C/L, more beneficially from 37.5 C/L to 180 C/L, and particularly beneficially from 42 C/L to 73.5 C/L.

From a similar viewpoint, the hydrogen-containing electrolyzed water beneficially has a pH ranging from 7.5 to 9.9, more beneficially from 8.0 to 9.8, and particularly beneficially from 8.5 to 9.5.

Next, the electrolytic current determiner 11 determines an electrolytic current for the electrolysis to be performed in the electrolysis tank D so that the electrical charge per unit quantity of the generated hydrogen-containing electrolyzed water reaches the target amount (Step S2). Then, the electrolytic current determiner 11 transmits a signal, on the determined electrolytic current, to the electrolytic current supplier 12 supplying the electrolysis tank D with the electrolytic current (Step S3).

Then, the electrolytic current supplier 12 supplies the electrolysis tank D with the electrolytic current based on the transmitted signal. The electrolysis tank D electrolyzes raw water to generate hydrogen-containing electrolyzed water to be used as agricultural electrolyzed water, so that the electrical charge per unit quantity of the generated hydrogen-containing electrolyzed water reaches the target amount (Step S4).

As can be seen, when the electrolysis is performed using the electrolyzed water generating apparatus 1 in the embodiment, the electrolytic current is controlled to generate the hydrogen-containing electrolyzed water having a desired amount of electrical charge per unit quantity of the generated hydrogen-containing electrolyzed water. The generated hydrogen-containing electrolyzed water attracts cations in the first electrode chamber Da, and is charged positively. Such hydrogen-containing electrolyzed water has a function to reduce dissociation of an oxidizing agent around the rhizosphere. This function successfully reduces oxidization of cell walls of plant roots negatively charged by a carboxyl group, and of cell membranes forming a lipid bilayer made of phosphatide. Moreover, the positively-charged hydrogen-containing electrolyzed water has the hydrogen bond enhanced and the water quality improved. Provided with such features, the agricultural electrolyzed water (the hydrogen-containing electrolyzed water) obtained may make the roots biologically more active and beneficially affect the plant growth.

Note that the embodiment may be modified as described below.

In the embodiment, the hydrogen-containing electrolyzed water is generated by galvanostatic electrolysis through the control of the electrolytic current; however, the hydrogen-containing electrolyzed water may as well be generated by controlled potential electrolysis through the control of an electrolytic voltage as long as it is possible to generate the hydrogen-containing electrolyzed water having a desired amount of electrical charge per unit quantity of the generated hydrogen-containing electrolyzed water.

EXAMPLES

The present invention is described below based on Examples. Note that the present invention is not limited to these Examples. The Examples may be modified and changed based on the intent of the present invention. Such modifications and changes are not excluded from the scope of the present invention.

Example 1

The electrolyzed water generating apparatus 1 illustrated in FIG. 1 was used to generate hydrogen-containing electrolyzed water for use as agricultural electrolyzed water.

Note that platinum iridium plates having an electrode surface area of 77 cm2 were used as an anode and a cathode. A polytetrafluoroethylene (PTFE) hydrophilic membrane was used as a separating membrane. Raw water, purified by a water purifier, was galvanostatically electrolyzed for approximately three seconds with a direct current (an electrolytic current of 1.4 A) to become hydrogen-containing electrolyzed water, so that the amount of electrical charge per unit quantity of the generated hydrogen-containing electrolyzed water was 42 C/L. Moreover, the hydrogen-containing electrolyzed water had a pH of 8.54.

Example 2

Hydrogen-containing electrolyzed water was generated in a similar manner as described in Example 1 except that the raw water was galvanostatically electrolyzed for approximately two seconds with a direct current (an electrolytic current of 2.45 A), so that the amount of electrical charge per unit quantity of the generated hydrogen-containing electrolyzed water was 44 C/L. Note that the hydrogen-containing electrolyzed water had a pH of 9.00.

Cultivation of Japanese Mustard Spinach

A culture solution containing the hydrogen-containing electrolyzed water generated in Example 2 was used to cultivate Japanese mustard spinach (35 bunches) employing the nutrient flow technique (NFT).

Note that the culture solution was prepared as follows: 225 g of Otsuka House Type 1 fertilizer and 150 g of Otsuka House Type 2 fertilizer were dissolved in 300 liters of the generated hydrogen-containing electrolyzed water, and Otsuka House A Shoho Hyojyun Baiyoueki culture solution was diluted in double the amount of the hydrogen-containing electrolyzed water. Table 1 shows the ingredient composition of Otsuka House A Shoho Hyojyun Baiyoueki culture solution. Moreover, the spinach was cultivated for 20 days under natural sunlight since planting. Furthermore, the culture solution was replaced every six days since planting.

TABLE 1

| Fertilizer (me/L) | Nitrogen (N) | Phosphorus (P) | Potassium (K) | Calcium (C) | Magnesium (Mg) |
|---|---|---|---|---|---|
| | 18.6 | 5.1 | 8.6 | 8.2 | 3.0 |

Then, 20 days after planting, height (mm), leaf width (mm), fresh weight (g/bunch) of a shoot system (parts above the ground, such as stem and leaves), and fresh weight (g/bunch) of a root system (parts below the ground, such as roots) of each spinach bunch were measured, and an average was calculated for each of the parts measured. Table 2 shows the calculation results.

As a comparative example, tap water was used instead of the hydrogen-containing electrolyzed water generated in Example 2 for the cultivation of Japanese mustard spinach under the same conditions. Twenty days after planting, the height (mm), leaf width (mm), fresh weight (g/bunch) of a shoot system (parts above the ground, such as stems and leaves), and fresh weight (g/bunch) of a root system (parts below the ground, such as roots) of each spinach bunch were measured, and an average was calculated for each of the parts measured. Table 2 shows the calculation results.

Cultivation of Basil

A culture solution containing the hydrogen-containing electrolyzed water generated in Example 2 was used to cultivate basil (35 bunches) employing the NFT.

Note that the culture solution used here was the same culture solution as that used for the cultivation of the above Japanese mustard spinach. Moreover, the basil was cultivated for 25 days under natural sunlight since planting. Furthermore, the culture solution was replaced every six days since planting.

Then, 25 days after planting, the number of leaves, fresh weight (g/bunch) of a shoot system (parts above the ground, such as stems and leaves), and fresh weight (g/bunch) of a root system (parts below the ground, such as roots) of each basil bunch were measured, and an average was calculated for each of the parts measured. Table 3 shows the calculation results.

As a comparative example, tap water was used instead of the hydrogen-containing electrolyzed water generated in Example 2, and the basil plants were cultivated under the same conditions. Twenty five days after planting, the number of leaves, fresh weight (g/bunch) of a shoot system (parts above the ground, such as stems and leaves), and fresh weight (g/bunch) of a root system (parts below the ground, such as roots) of each basil bunch were measured, and an average was calculated for each of the parts measured. Table 3 shows the calculation results.

TABLE 2

| Tested Water | Height (mm) | Leaf Width (mm) | Shoot System (g/bunch) | Root System (g/bunch) |
|---|---|---|---|---|
| Hydrogen-Containing Electrolyzed Water | 316 | 117 | 37.82 | 4.83 |
| Tap Water | 310 | 109 | 36.21 | 3.86 |

TABLE 3

| Tested Water | Number of Leaves | Shoot System (g/bunch) | Root System (g/bunch) |
|---|---|---|---|
| Hydrogen-Containing Electrolyzed Water | 58 | 27.83 | 14.43 |
| Tap Water | 56 | 25.33 | 11.30 |

Table 2 shows that, in the example employing the culture solution prepared from the hydrogen-containing electrolyzed water, the spinach plants exhibit an average plant height and weight of the shoot system and the root system which exceed that in the example employing tap water. Likewise, Table 3 shows that in the example employing the culture solution prepared from the hydrogen-containing electrolyzed water, the basil plants exhibit an average leaf number and weight of the shoot system and the root system which exceed that in the example employing tap water.

The above examples show that the hydrogen-containing electrolyzed water, generated with the amount of electrical charge per unit quantity of the water adjusted through the control of the electrolytic current, may be employed as agricultural electrolyzed water useful for plant growth.

The present invention is useful for an agricultural electrolyzed water generating apparatus which electrolyzes water to generate agricultural electrolyzed water. The present invention is also useful for generating the agricultural electrolyzed water.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

DESCRIPTION OF REFERENCE CHARACTERS

1 Electrolyzed Water Generating Apparatus
4a First Water Inlet Path
4b Second Water Inlet Path
6a Cathode
6b Anode
7a First Water Outlet Path
7b Second Water Outlet Path
10 Charge Amount Adjuster
11 Electrolytic Current Determiner
12 Electrolytic Current Supplier
13 Storage Device
D Electrolysis Tank
Da First Electrode Chamber (Cathode Chamber)
Db Second Electrode Chamber (Anode Chamber)
Sp Separating Membrane

The invention claimed is:

1. A method for generating agricultural electrolyzed water, the method comprising: providing an agricultural electrolyzed water generating apparatus comprising an electrolysis tank containing a first electrode chamber having a cathode, a second electrode chamber having an anode, a separating membrane separating the first electrode chamber and the second electrode chamber from each other, and an electrolytic current determiner;
transporting raw water from outside the agricultural electrolyzed water generating apparatus to the first electrode chamber via a first water inlet path connected to the first electrode chamber;
transporting raw water from the outside to the second electrode chamber via a second water inlet path connected to the second electrode chamber;
generating, by electrolysis, hydrogen-containing electrolyzed water in the first electrode chamber and electrolyzed acidic water in the second electrode chamber;
carrying, via a first water outlet path, the hydrogen-containing electrolyzed water to the outside; and
carrying, via a second water outlet path, the electrolyzed acidic water to the outside,
wherein:
the electrolysis comprises determining an electrolytic current and adjusting, in response to the electrolytic current determined via at least the electrolytic current determiner and via a charge amount adjuster connected to the electrolysis tank and controlling an electrolytic current or an electrolytic voltage, an amount of electrical charge per unit quantity of the hydrogen-containing electrolyzed water; and
the adjusting of the amount of electrical charge per unit quantity of the hydrogen-containing electrolyzed water is controlled to maintain the amount of electrical charge per unit quantity of the generated hydrogen-containing electrolyzed water within a pre-defined range of values.

2. The method of claim 1, wherein the charge amount adjuster is configured to control the electrolytic current.

3. The method of claim 2, wherein the adjusting is further controlled by:
an electrolytic current supplier connected to the electrolytic current determiner and the electrolysis tank, and supplying the electrolysis tank with the electrolytic current; and
a storage device connected to the electrolytic current determiner to store data indicating a target amount of electrical charge per unit quantity of the generated hydrogen-containing electrolyzed water.

4. The method of claim 3, further comprising the step of reading data in the storage device and adjusting the amount of electrical charge per unit quantity of the hydrogen-containing electrolyzed water based upon the target amount indicated in the read data.

5. The method of claim 4, further comprising determining the electrolytic current so that the amount of electrical charge per unit quantity of the hydrogen-containing electrolyzed water is adjusted to reach the target amount.

6. The method of claim 5, further comprising transmitting a signal indicating the determined electrolytic current to the electrolytic current supplier.

7. The method of claim 1, further comprising the steps of:
reading data in a storage device and adjusting the amount of electrical charge per unit quantity of the hydrogen-containing electrolyzed water based upon the target amount indicated in the read data; and
determining an electrolytic current so that the amount of electrical charge per unit quantity of the hydrogen-containing electrolyzed water is adjusted to reach the target amount.

8. The method of claim 7, further comprising transmitting a signal indicating the determined electrolytic current to an electrolytic current supplier.

9. The method of claim 1, further comprising the steps of:
- determining an electrolytic current so that the amount of electrical charge per unit quantity of the hydrogen-containing electrolyzed water is adjusted to reach a target amount; and
- transmitting a signal indicating the determined electrolytic current to an electrolytic current supplier.

10. The method of claim 1, wherein adjusting is controlled to ensure that the amount of electrical charge per unit quantity of the generated hydrogen-containing electrolyzed water ranges from 8 C/L to 300 C/L.

11. The method of claim 1, wherein adjusting is controlled to ensure that the hydrogen-containing electrolyzed water has a pH ranging from 7.5 to 9.9.

* * * * *